Figure 1:
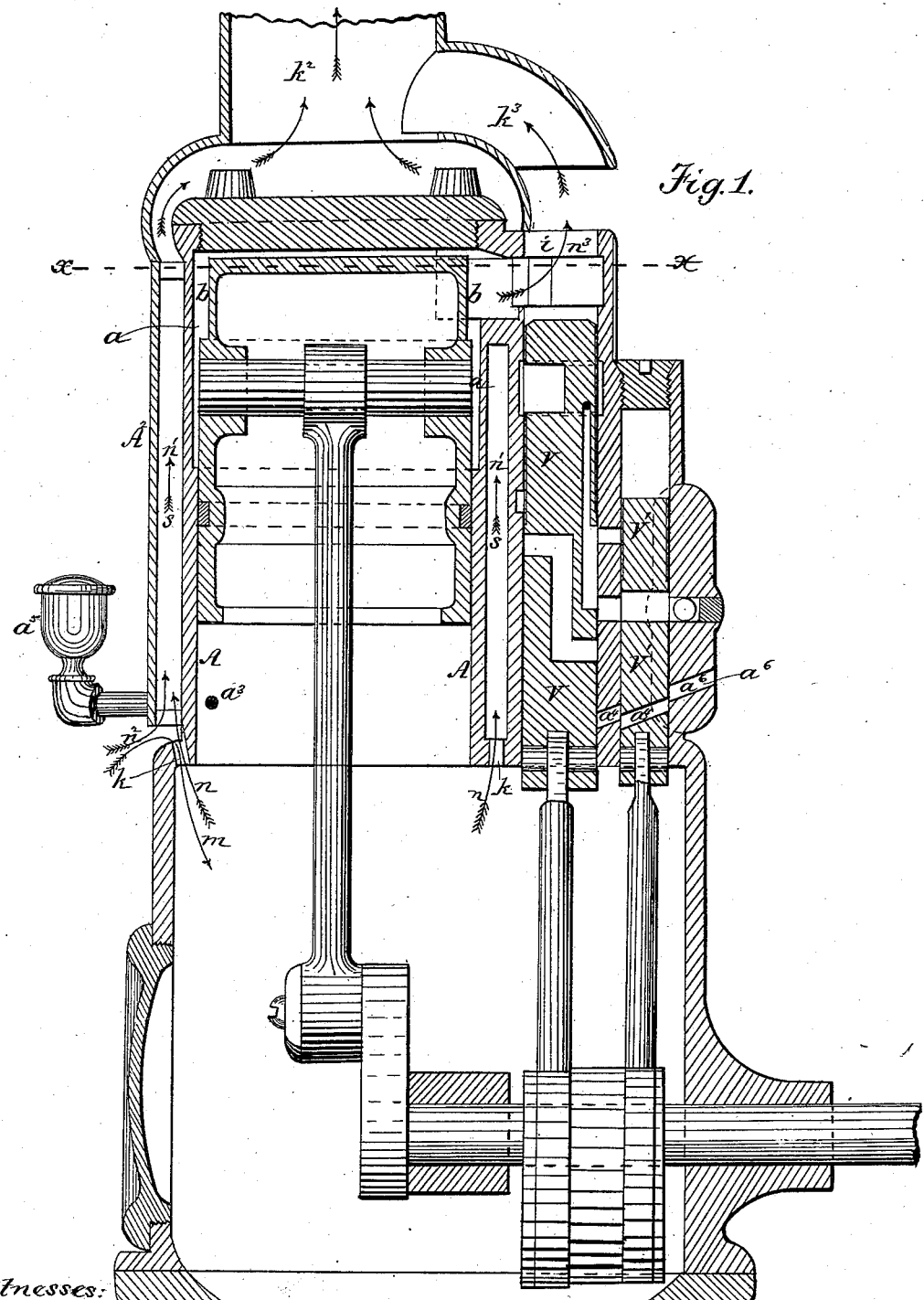

(No Model.)  2 Sheets—Sheet 1.

L. H. NASH.
GAS ENGINE.

No. 312,498.  Patented Feb. 17, 1885.

(No Model.) 2 Sheets—Sheet 2.

L. H. NASH.
GAS ENGINE.

No. 312,498. Patented Feb. 17, 1885.

Witnesses:

Inventor:
Lewis Hallock Nash
by Johnson and Johnson
Attys

UNITED STATES PATENT OFFICE.

LEWIS HALLOCK NASH, OF BROOKLYN, ASSIGNOR TO THE NATIONAL METER COMPANY, OF NEW YORK, N. Y.

GAS-ENGINE.

SPECIFICATION forming part of Letters Patent No. 312,498, dated February 17, 1885.

Application filed July 22, 1884. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

My invention relates to means for preventing the undue heating of the power-cylinder and piston of a gas-engine. Hitherto this has been effected by a water-circulation within what is called a "cooling-jacket" for the power-cylinder. It has also been proposed to maintain a circulation and agitation of air over the power-cylinder by the operation of the piston, as a means of preventing the overheating of the cylinder and piston. In such case cooling-air passages on each side of the cylinder open into a hot-air space over the cylinder, into which passages and top chamber the piston sucks air through bottom openings, so that the air is heated by contact with the walls of the cylinder, and in such heated condition the air is forced out in a reverse direction over the same heated walls, so that in fact the air can have very little cooling effect, since it is already hot. The circulation is produced by drawing cold air in over the cylinder-walls and then reversing and forcing it out hot. Moreover, the amount of air so acted upon is very small, being only equal to the amount displaced by the piston.

My improvement effects the cooling of the cylinder by continuous currents of cold air many times the volume of the air displaced by the piston, forced over the walls of the cylinder by the pumping action of the piston, so that the cooling action is continuous and effective.

The objects of my improvement are to provide a forced draft of cool air in one direction only through a jacket surrounding the cylinder of a gas-engine by the natural draft of the heated air within the engine-casing, and by the action of jets of air caused by the operation of the engine-piston; and to provide for carrying off the heated air from said cooling-jacket through the chimney of the building, and thereby increase the force and cooling effect of the cold-air currents over the hot power-cylinder; to provide for carrying off the waste products of combustion from the power-cylinder through the chimney of the building, thus reducing the heat of the room—an important matter in the hot seasons—and to avoid the objectionable and troublesome features of the water-jacket.

Another important object of my improvement is to prevent the power-cylinder from becoming fouled by oil and waste products of combustion.

Figure 2:
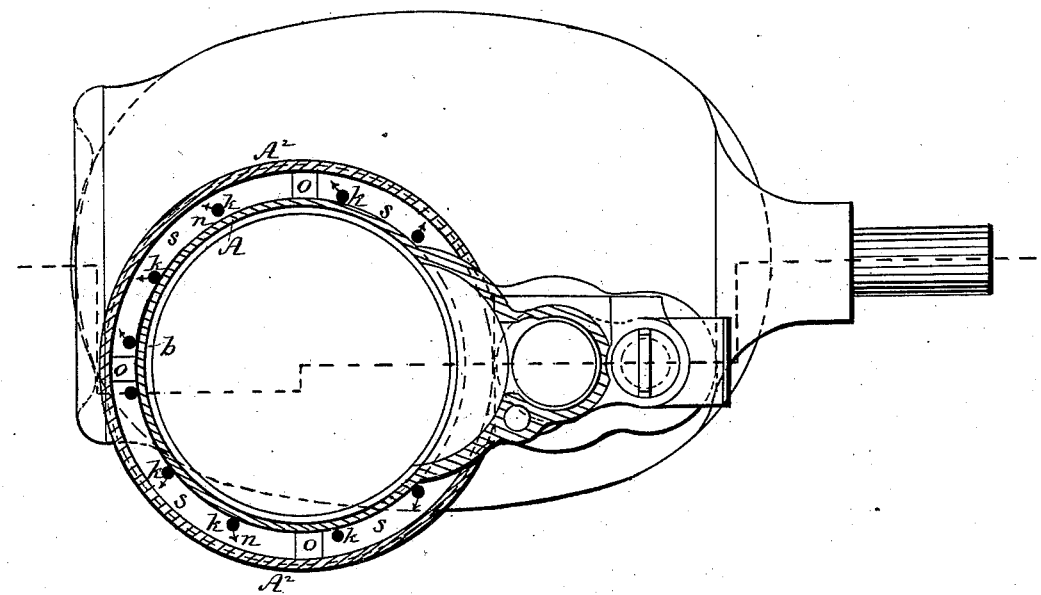

Referring to the accompanying drawings, Figure 1 represents a vertical central section of a single-acting gas-engine embracing my invention; Fig. 2, a horizontal section taken on the line $x\ x$ of Fig. 1, showing the jacket through which cold-air currents are forced over the walls of the power-cylinder; and Fig. 3, a similar section, showing the divided passages of the jacket.

Figure 3:
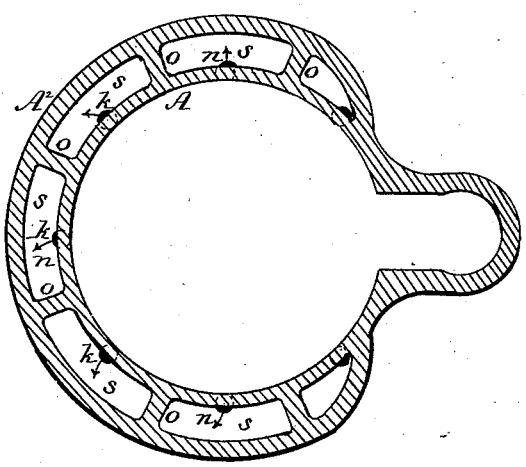

Any suitable arrangement and operation of valves may be used, that shown being the same as described and shown in an application for a patent for gas-engine filed by me February 6, 1884, under Serial No. 119,941, which also embraces a provision for cooling the power-cylinder by outside air-jets produced by the working of the piston. The power-cylinder A and the jacket $A^2$ are preferably cast in one piece, the jacket being open at the top and at the bottom, and connected to the cylinder by ribs $o$, as shown in Fig. 3. The jacket $A^2$ extends from near the lower open end of the cylinder and over and incloses its upper closed end. The engine-case A has jet-openings $k$ around it just below the lower end of the jacket and at the lower end of the cylinder, which open into the casing at this point, there being one or more such jet-openings for each space $s$ of the jacket between the connecting-ribs $o$, so that the jacket stands and receives the forced air-currents from these vertical jet-openings of the engine-case, and also from the outside of the case under the action of the piston. These forced cooling-currents are produced by the forward stroke of the piston, which, forcing the air out of the case in strong jets through the openings $k$, as shown by the arrows $n$, causes thereby a strong draft of air into and through the jacket-spaces in contact with the cylinder-walls, as shown by the arrows $n'$. These forced air-jets serve also to suck in a strong draft of cold air with them, as shown by the arrow $n^2$, and these cold-air currents, passing continuously through the jacket in the same direction, will abstract the heat from the walls of the power-cylinder, so as to prevent it from being too greatly heated by the radiation of the heat produced from the combustion of the charge within the cylinder. Upon the return-stroke of the piston fresh cold air will be drawn into the engine-casing A through the jet-openings $k$, as shown by the arrow $m$; but the air so drawn in will not reverse the upward draft of air within the jacket, because the in-draft caused by air entering the case-openings $k$ (indicated by the arrows $m$) will be in the same direction from the outside as the draft entering the jacket-spaces $s$, (indicated by the arrows $n^2$,) and will tend also to assist said upward draft. The continuous cooling-air drafts entering the jacket from the outside are thus produced by air-jets forced from the engine-casing. To still further increase the air-draft through the jacket, I have provided a pipe, $k^2$, which joins the open top of the jacket over the cylinder, and may be connected with the chimney of the building, and thus serve also to carry off the hot air and increase the cooling effect. I also utilize this top jacket connecting-pipe, $k^2$, to carry off the waste products from the engine by an open draft-passage, $k^3$, which opens over the top escape-port, $i$, of the engine-valve V and into the chimney, so that the waste gases escaping from the engine, as indicated by the arrow $n^3$, will enter the draft-passage $k^3$ and pass off out of the room.

I have shown the cylinder as having its inner wall recessed at the power end $a$, so that the piston does not touch the cylinder at this end, but the joint-forming is maintained at its lower end away from the combustion end. Therefore the draft of air is from the cooler to the upper hotter end of the cylinder, and the air becomes more and more heated as it travels from its joint-forming end. This construction of the cylinder is important in connection with the jacket-cooling air-currents, for the cooling effect of the continuous air-currents would not be sufficient to keep the power end of the engine cool enough to have the piston work upon it, and the open jacket for forced air-currents is only rendered effective when the contact of the piston and cylinder is maintained at the lower cooler part of the cylinder.

I prevent the engine from becoming fouled by oil and the waste products by means which I shall now describe. The cause of fouling is from the oil used in lubricating the piston and working parts collecting in the combustion-chamber and upon hot portions of the valves and there becoming hard and baked. All horizontal engines have this trouble, and need to be cleaned often. The cylinder stands vertical, with its combustion-chamber at the top, and the inner wall of the combustion-chamber is recessed at $a$ for a distance equal, or nearly so, to the length of the piston's stroke. With this construction of cylinder the oil is best admitted to the piston at the lower end of the cylinder in small quantities from a cup, $a^5$, through a hole, $a^3$, in the cylinder-wall. In this connection the reduction in the diameter of the piston at its upper end, $b$, is also important. The oil entering at $a^3$ will run down and cover the lower inner wall of the cylinder, and the operation of the piston will distribute the oil over all the bearing-surfaces of both piston and cylinder; but since the combustion end of the cylinder is not in contact with the piston no oil will collect there, and therefore no collection of foreign matter. Should there be a surplus of oil, it will drip into the lower part of the engine-casing. The valves V V' are provided with downwardly-inclined holes $a^4$ at their lower ends for the supply of oil through a hole, $a^6$, in casing-wall, and only a small portion of the oil will be worked up to the top of the valves. These valves V V' have suitable ports and passages, and operate in chambers having suitable ports and passages, so that the valves communicate with the combustion-chamber in the proper manner. At their upper ends the valves are made to fit loosely and at their lower ends closely to the walls of their chambers, so that the upper ends of the valves do not bear upon their chamber-walls, but all the bearing is maintained at the lower end of the valves. The object of this is to allow space around the upper ends of the valves for the collection of a thin scale of oxide and oil, which will soon become baked hard upon them, and the upper ends of the valve-chambers will be similarly covered by a coating, which will prevent the contact of the metal surfaces, and the valves will work without wear at their upper ends, no matter how hot the combustion end of the cylinder may become.

It is obvious that the cooling action of the continuous forced air-currents in one direction through the jacket does not depend upon the use of the chimney, and the latter may be dispensed with; but the jacket may act by the chimney-draft only.

I claim—

1. The combination, with the piston, of the power-cylinder of a gas-engine, having a jacket open at each end, and the engine-casing having jet-openings arranged around its outer wall in the relation to the lower open end of the jacket and to the lower open end of the cylinder as described, whereby a continuous draft of outside-air currents is produced through said jacket in one direction only in contact with the outer cylinder-walls by the operation of the piston.

2. The method herein described of cooling the power-cylinder of a gas-engine, which consists in forcing a continuous draft of cool air in one direction through a jacket of said cylinder by means of jets of air forced by the operation of the piston from the engine-casing at points in the outer vertical wall of said casing, substantially as described.

3. The combination of the power-cylinder of a gas-engine, having a jacket for cooling-air currents, with a draft-chimney, into which the said jacket opens at its upper end above said cylinder, whereby to increase the draft and cooling effect of the jacket and carry off the heated air therefrom.

4. The combination, with the power-cylinder and the piston of a gas-engine, of a cooling-jacket for air-currents, open at both ends, and inclosing the sides and upper end of said cylinder, substantially as described.

5. The combination of an air-cooling jacket for the power-cylinder, open at both ends, with draft-producing jet-openings in the outer wall of the engine-casing, and the piston, for the purpose of causing a continuous forced circulation of air-currents through said jacket in one direction, as set forth.

6. The combination, with an air-cooling jacket for the power-cylinder, open at both ends, of a draft-chimney therefor, having a draft opening or pipe arranged to receive and carry off the products of combustion from the engine, substantially as described.

7. The combination, with the power-cylinder of a gas-engine, having the inner wall of its combustion-chamber recessed, as described, of a piston having its joint-forming bearing upon the lower end of said cylinder, and a cooling-air jacket for said cylinder, through which cooling-air currents are passed continuously in contact with the reduced cylinder-wall.

8. The combination, with the power-cylinder of a gas-engine, having its combustion-chamber recessed, as described, and a piston reduced in diameter at its acting end, of means whereby lubricating-oil is applied to the bearing portion of said cylinder and piston at the lower end of the former, as set forth, for the purpose specified.

9. The combination, in a gas-engine, of the slide-valves V V', made to fit their chamber-walls, with bearing-joints only at their lower cooler ends, and provided at their bearing ends with lubricating-ducts, for the purpose specified.

In testimony whereof I have hereunto set my hand in the presence of two subscribing witnesses.

LEWIS HALLOCK NASH.

Witnesses:
H. W. BRINCKERHOFF,
CHRISTOPHER C. WHITTEMORE.